US006985520B1

(12) United States Patent
Vitenberg

(10) Patent No.: US 6,985,520 B1
(45) Date of Patent: Jan. 10, 2006

(54) MULTIPOINT DIGITAL SUBSCRIBER LINES WITH HOME DATA NETWORK ABILITY

(75) Inventor: Roman Vitenberg, Holon (IL)

(73) Assignee: Coppergate Communication, Ltd., Tel Aviv (IL)

( * ) Notice: Subject to any disclaimer, the term of this patent is extended or adjusted under 35 U.S.C. 154(b) by 908 days.

(21) Appl. No.: 09/599,405

(22) Filed: Jun. 22, 2000

(30) Foreign Application Priority Data

Feb. 6, 2000 (IL) .................................... 134402
Jun. 15, 2000 (IL) .................................... 136782

(51) Int. Cl.
*H04B 1/38* (2006.01)
(52) U.S. Cl. .................................................... 375/222
(58) Field of Classification Search ................ 375/219, 375/222, 140, 139, 260, 220, 259; 379/93.01, 379/92.03, 92.04, 406, 416, 93.07, 93.09, 379/93.11; 370/480, 483, 487, 210, 401, 370/229, 466, 474, 467
See application file for complete search history.

(56) References Cited

U.S. PATENT DOCUMENTS

| | | | | |
|---|---|---|---|---|
| 4,639,921 A | * | 1/1987 | Gang et al. .................. | 714/807 |
| 5,898,761 A | | 4/1999 | McHale et al. | |
| 5,901,205 A | * | 5/1999 | Smith et al. .............. | 379/93.01 |
| 5,905,781 A | | 5/1999 | McHale et al. | |
| 5,982,784 A | | 11/1999 | Bell | |
| 5,999,565 A | | 12/1999 | Locklear, Jr. et al. | |
| 6,028,867 A | * | 2/2000 | Rawson et al. ............. | 370/463 |

FOREIGN PATENT DOCUMENTS

WO   WO 97/37458   10/1997

OTHER PUBLICATIONS

ITU-T Recommendation G. 992.2:Splitterless ADSL Transceivers, Jun. 1999, XP002181912.
TU-T G.992.1 Series G: Transmission Systems and Media, Digital Systems and Networks, Digital Transmission Systems Access Networks, Asymmetrical Digital Subscriber Line (ADSL) Transceivers (Jun. 1999).
Draft Standard-T1E1.413 Issue 2: Standards Project for Interfaces Relating to Carrier to Customer Connection of Asymmetrical Digital Subscriber Line (ADSL) Equipment, Committee T1-Telecommunications, Nov. 30-Dec. 4, 1998.
Peter S. Chow et al., "A Multi-drop In-house ADSL Distribution Network", Serving Humanity Through Communications. Supercomm/Icc. New Orleans, May 1994, International Conference on Communications, New York, IEEE, US, vol. 1, pp. 456-460.

*Primary Examiner*—Emmanuel Bayard

(74) *Attorney, Agent, or Firm*—Alphapatent Associates Ltd.; Daniel J. Swirsky

(57) ABSTRACT

A communication system is provided. It comprises a central office (CO) of a communication service provider and at least one subscriber premise (SP), each SP being linked to a CO by a subscriber-associated communication line comprising a twisted pair of telephone lines, and at least one xDSL modem in the CO coupled to said subscriber-associated communication line. Each SP has a plurality of communication devices, which comprises one or more telephone devices connected to the communication line and at least one network DSL (NDSL) modem associated with a computerized device, the NDSL modem being connected to said communication line; each of said modems having an upstream transmitter and a downstream receiver for communication with the CO and an upstream transmitter and an upstream receiver for communication with other NDSL modems within the SP. Provided is also a novel NDSL modem for use in the above system.

21 Claims, 12 Drawing Sheets

Multipoint NDSL SYSTEM

U.S. PATENT DOCUMENTS

| | | | |
|---|---|---|---|
| 6,278,706 B1 * | 8/2001 | Gibbs et al. | 370/352 |
| 6,282,273 B1 * | 8/2001 | McHale et al. | 379/93.28 |
| 6,295,357 B1 * | 9/2001 | Staples et al. | 379/418 |
| 6,456,650 B1 * | 9/2002 | Cheng et al. | 375/222 |
| 6,466,584 B1 * | 10/2002 | Maxwell et al. | 370/465 |
| 6,563,864 B1 * | 5/2003 | Ibrahim et al. | 375/222 |
| 6,633,572 B1 * | 10/2003 | Olshansky et al. | 370/401 |
| 6,775,305 B1 * | 8/2004 | Delvaux | 370/535 |

* cited by examiner

Multipoint Digital Subscriber Line with home data network ability (NDSL)

MULTIPOINT DIGITAL SUBSCRIBER LINES WITH HOME DATA NETWORK ABILITY

FIELD OF THE INVENTION

The present invention relates generally to data and voice communications over digital subscriber lines consisting of twisted pair telephone cables. More particularly, the invention concerns a system and devices for multipoint communication in a splitterless asymmetrical digital subscriber line (ADSL) system.

BACKGROUND OF THE INVENTION

Digital Subscriber Line is a new communication technology that allows existing twisted pair Cable Telephone Network to be converted into a high-performance Multimedia Digital Network for multimedia and high-speed data communications with the ability to provide to every subscriber high speed data communication that includes many new services as Video-on-demand, Conference VideoPhone, HDTV Broadcast, Digital Hi Fi Audio, Fast Internet and others.

Digital Subscriber Line technology includes several types of xDSL systems with different patterns of downstream and upstream data bit rate: Symmetrical Digital Subscriber Line (SDSL), Asymmetrical Digital Subscriber Line (ADSL), Very high speed Digital Subscriber Line (VDSL) and others.

These international standards define the frequency bands permitted for downstream (in the direction from a Central Office (CO) of a communication service to a home modem) or of upstream (in the direction from the home modem to the CO) transmission for different DSL systems. As a result, different DSL systems may function properly on the different twisted pairs of the same telephone cable.

FIG. 1 illustrates the frequency band allocation plan for the DSL system in accordance with ITU regulation. A "Plain Old Telephone Service" (POTS) occupies voice frequency band 101 up to a frequency of 4 kHz. An Asymmetric Digital Subscriber Line (ADSL) uses digital multitone (DMT) line signals for communication between subscriber equipment and the central office (CO) of the telephone station. ADSL equipment of the CO transmits downstream data by modulation of about 200 tones in frequency band 105 from 200 kHz to 1100 kHz and receives about 30 tones of upstream data in frequency band 103 from 28 kHz to 140 kHz. ADSL systems are able to transmit downstream data with speeds of up to 10 Mb/s and upstream data with speeds of up to 1 Mb/s. ADSL was specially developed for long cable lines of up to 4.5 km in length.

In VDSL, data may be transmitted with a much higher bit rate: downstream data up to 56 Mb/s and upstream data up to 26 Mb/s but works only on short cable lines of up to 1.5 km.

As shown on FIG. 1 four frequency bands are defined for the VDSL system: two for downstream transmission (one band 107 from 0.3 MHz to 3.0 MHz and the other band 109 from 5.2 MHz to 7.5 MHz), and two bands for upstream transmission (one band 111 from 3.0 MHz to 5.2 MHz and another band 113 from 7.5 MHz to 12 MHz). Depending on cable length and necessary bit rate these bands may be partially or completely used. VDSL may be realized with DMT line signal and with CAP modulation.

The most wide-spread ADSL use is in point-to-point connected circuits. Such a system includes an ADSL modem on each end of the twisted pair telephone line, creating three information channels—a high speed downstream (central office to end user) channel, a medium speed upstream (end user to central office) channel, and a POTS ("Plain Old Telephone Service") channel. The POTS channel is separated from the ADSL modem by filters, thus guaranteeing uninterrupted POTS, even if the ADSL circuit fails.

Two variants of ADSL systems are available today: full-rate ADSL in accordance with the T1E1.413 or ITU G.992.1 standards and "splitterless" ADSL in accordance with the ITU G.992.2 standard. Full-rate ADSL uses POTS splitters to separate the POTS channel from the ADSL data signals. A POTS splitter is installed at each end of the line and includes a low-pass filter for separating out POTS telephone voice communication signals and a high-pass filter for separating out data communication signals.

The POTS splitter divides the subscriber line into two separate twisted pairs—one for data communication (ADSL) and one for telephone voice communication signals (POTS). As a result, the existing two-wire internal house telephone wiring is not usable for ADSL. New wiring must be installed from the splitter to the modem, resulting in increased installation cost.

Splitterless ADSL can be installed without the need for additional home wiring. In this case, the ADSL modem includes a high-pass filter that rejects the POTS telephone voice communication signal, while every telephone instrument in the house is connected to the telephone line through a low-pass microfilter that rejects the ADSL data signals. A splitterless ADSL system is advantageous in that it is a "Plug and Play" system. A customer does not need any special service from his telephone company to install the ADSL home equipment. What is needed therefore is an ADSL home modem and a number of microfilters (according to the number of telephones in the house) and to plug those devices into existing telephone connectors. Given the ease of connection several PC (personal computer) manufacturers include splitterless ADSL modems (G.LITE modems) within the PCs motherboards and also supply the several microfilters with the PC.

FIG. 2 is a block diagram illustrating a prior art splitterless ADSL system generally designated 201. A number of subscriber premises 203 are coupled to a central office (CO) 209 by a telephone cable 217 comprising a plurality of twisted pair subscriber telephone lines 207. At the subscriber premises 203 there are customer premises equipment including personal computers (PC) 225 (two in this specific example), a printer 227, a fax 221 and telephone devices 223. One PC 225 is connected to another PC 225 and to printer 227 by parallel port cables 229 constituting together a digital home network. An ADSL modem is connected directly to telephone line 207 and by an Ethernet cable 224 to one of the PCs 225. Fax 221 and telephone device 223 are connected to telephone line 207 by microfilters 219. CO 209 includes ADSL Office Equipment 211, a data switch 235, linked to a data network 215 and a voice switch 237 linked to a voice network 213. Each twisted pair subscriber telephone line 207 is coupled to a POTS splitter 231, which is coupled to the voice switch 237 and to an ADSL office modem 233.

Voice communications passing through voice switch 237 are passed through POTS splitter 231 and applied to twisted pair 207 as baseband signals. Data communications passing through data switch 235 are modulated at a frequency range higher than that of the baseband POTS signals, passed through POTS splitter 231 and applied to twisted pair 207. Since the data communications are transmitted at a different frequency range than the voice communications, frequency-division multiplexing (FDM) allows simultaneous transmission of both voice communications (POTS) and data communications over a single twisted pair 207.

A standard ADSL system has some shortcomings. For one, an ADSL system needs to be always connected. It means that the ADSL modem continuously transmits and receives DMT signals regardless whether information is transmitted or not. As a result, a plurality of ADSL modems 233 of the Central Office work continuously and consume extensive energy. Additionally, at the other end, only one ADSL home modem may be connected to the telephone line in the home because frequency bands of upstream and downstream are always busy. In the USA, this has become a problem as about 20 million subscribers have more than one PC inside the home. When two or more PCs in the home have internal ADSL modems, only one of them may be physically connected to the telephone line. Every time a customer wants to access the Internet from another PC, he must connect this PC to the telephone line and disconnect other PCs.

Another problem is that existing splitterless ADSL systems do not support communication between several computers within the home. It means that a subscriber must have an additional home data network like Ethernet and additional network equipment inside their PCs. A further problem resides in that existing ADSL home modems may not support future VDSL systems. A VDSL system is expected to become widespread over the coming years. Telecommunications companies are expected to replace existing ADSL Central Office equipment with new VDSL equipment, which will be able to support a much higher data bit rate.

SUMMARY OF THE INVENTION

The present invention is directed to a system and modems for multipoint communication in a splitterless asymmetric digital subscriber line (ADSL) system. The system of the present invention includes at least one subscriber premises ("SP") and a central office of a telephone communication provider (to be referred to herein as "Central Office" or "CO"). The home may be a home residence, a small office, etc. In the system of the invention the subscriber premises and the Central Office are connected by a twisted pair subscriber telephone line. The subscriber premises in accordance with the invention, comprises a plurality (two or more) of NDSL (network DSL) modems. Each NDSL modem within the subscriber premises may be directly connected to the same home telephone line and may communicate with any other home NDSL modem, in the same, premises or with the office xDSL (ADSL or VDSL) modem. In accordance with the present invention, the multipoint NDSL system provides not only data and voice service to and from said premises, but also network data communication within the premises.

The mode of communication in accordance with the invention for internal home communication through the home network is different than that between the NDSL modem and the Central Office xDSL modem.

In accordance with the invention there is thus provided a communication system comprising:
  a central office (CO) of a communication service provider and at least one subscriber premises (SP), each SP being linked to a CO by a subscriber-associated communication line comprising a twisted pair telephone line;
  at least one xDSL modem in each CO coupled to said subscriber-associated communication line; and
  a plurality of communication devices in each SP, said devices comprising one or more telephone devices connected to the communication line and at least one network DSL (NDSL) modem associated with a computerized device, the NDSL modem being connected to said communication line; each of said modems having an upstream transmitter and a downstream receiver for communication with the CO and an upstream transmitter and an upstream receiver for communication with other NDSL modems within the SP.

The computerized devices associated with the NDSL modem may be selected from a variety of such devices which can transmit or receive digital data. These include computers, particularly personal computers, as well as other devices which can receive, transmit or store digital data or respond to such data including: a video recorder; a home television, e.g. a high definition television (HDTV); and a variety of home appliances, which can respond to digital command packets such as electronic locks, door closures with an electronic control module, a cooker with an electronic control module and others. The NDSL modem may be an independent device coupled to the computerized device, or may be integral therewith.

The NDSL modem also comprises means for transmitting a control signal to which the CO modem is not receptive and which signals at least one other NDSL modem to be ready to receive data packets. Such a control signal is typically at a frequency not used for communication between the NDSL modem and the CO modem, e.g a DMT signal.

The present invention also provides a local network installed in premises of a subscriber of a communication service, the network being linked to an xDSL modem of a central office (CO) of a communication service provided by a communication line comprising a twisted pair telephone line, the network comprising:
  a plurality of communication devices comprising one or more telephone devices connected to the communication line and at least one network DSL (NDSL) modem associated with the NDSL modem being connected to said communication line; each of said modems having an upstream transmitter and a downstream receiver for communication with the CO and an upstream transmitter and an upstream receiver for communication with other NDSL modems within the SP.

The present invention still further provides a home network DSL (NDSL) modem comprising:
  an upstream transmitter and a downstream receiver for communication with an xDSL modem placed at a central office (CO) of a communication service provider through a twisted pair telephone line linking the NDSL modem and the xDSL CO modem, and comprising an upstream transmitter and an upstream receiver for communication with other NDSL modems included within the same subscriber premises.

In accordance with one embodiment of the invention, the communication between the NDSL modem and the office ADSL modem is realized by the application of the ADSL communication standard—FDM (frequency division—multiplex) duplex protocol, during short communication cycles (communication cycles initiated by a computer in the SP prompting the NDSL modem to connect to an Internet service provider or to any other computer network (ISP)). An NDSL modem may then connect to the telephone line and activate a standard ADSL communication protocol (e.g. in accordance with ITU G.992.2) to establish communication with the CO ADSL modem. Upon downloading of requested data, e.g. an Internet page, the NDSL modem disables the ADSL office modem and disconnects from the telephone line. The ITU G.992.2 standard provides for several special commands for disabling the CO modem, which may be employed by the NDSL modem to assume communication, without any change in existing CO ADSL equipment.

During data exchange with the CO according to the above embodiment, downstream data transmits at a frequency within the ADSL downstream frequency band 105, and upstream data transmits at a frequency within the ADSL upstream frequency band 103 (see FIG. 1). When data is not transmitted between the CO and any of the NDSL modems, the ADSL upstream frequency band 103 may be used for communication with the SP network.

Data communication with the SP network may be established between any two NDSL modems, performing part of or associated with a home computer (typically a personal computer—"PC"). In this case a half-duplex mode of communication may be used: one of the NDSL modems transmits the data at a frequency within the ADSL upstream frequency band 103 and another ADSL modem thus receives data at this frequency. The information exchange between the two NDSL modems is then realized by transmitting data packets in two directions. A control signal that is necessary for establishing connection and to properly transfer packets of a translation protocol may be a digital control tone that is not used in standard ADSL transmission and to which standard CO ADSL modems are not receptive.

In accordance with another embodiment of the invention, ADSL upstream band 103 and VDSL upstream bands 111, 113 are employed for data communication in a half-duplex mode within the SP network. In accordance with this embodiment of the invention, an NDSL modem comprises a universal ADSL/VDSL transmitter, which may transmit DMT line signals in the ADSL upstream frequency band 103, as well as in VDSL frequency bands 111, 113. The NDSL modem of this embodiment comprises also an additional VDSL upstream receiver. The universal ADSL/VDSL transmitter and the additional VDSL downstream receiver, may be used also for communication with a VDSL CO modem, replacing the standard CO ADSL modems. Thus, in accordance with this embodiment, the SP equipment is "VDSL-ready", namely it is ready for future expected upgrades of Central Office equipment from current ADSL modems to VDSL modems.

In accordance with yet another embodiment of the invention, the SP comprises one or more N.LITE modems which may communicate through the home networks with other modems using the ADSL upstream frequency band. N.LITE modems may be used for connection to home data network devices such as a printer, scanner and others, which do not need to directly link to the CO.

In accordance with a further embodiment of the invention, the SP comprises one or more N.LITE set-top boxes that may communicate, through the home network, with other N.LITE set-top boxes using the ADSL upstream frequency band. An N.LITE set top box comprises, in one embodiment, an N.LITE modem and an RF (radio frequency) transceiver, which supports radio communication with many different home devices including, for example, air conditioners, lighting devices, electronic locks, door closures, and others.

The invention will now be described in the foregoing, in some specific, non-limiting embodiments, illustrated in the annexed drawings.

DETAILED DESCRIPTION OF SPECIFIC EMBODIMENTS

Figure 1:
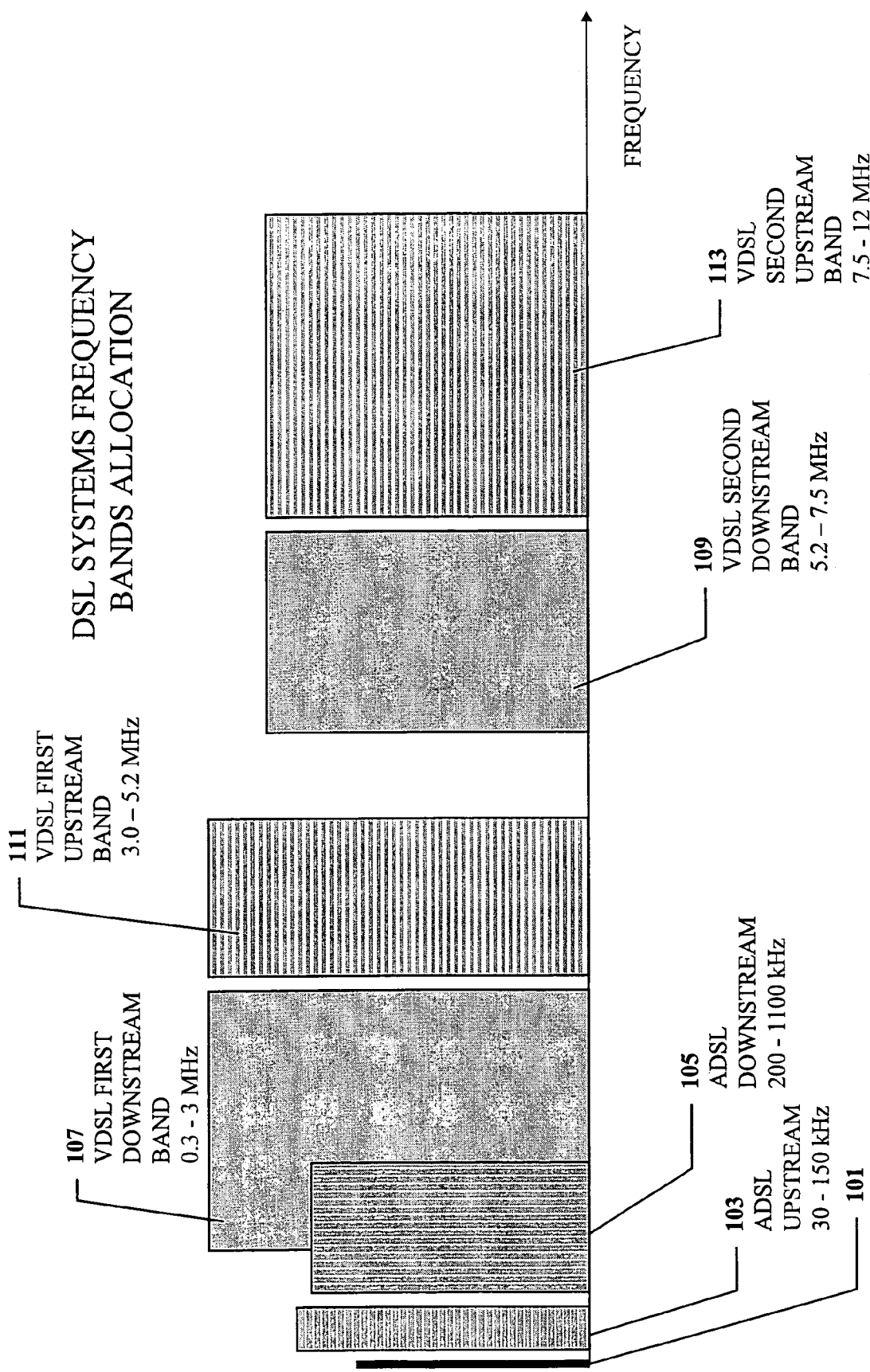
FIG. 1 illustrates frequency band allocation for xDSL systems.
Figure 2:
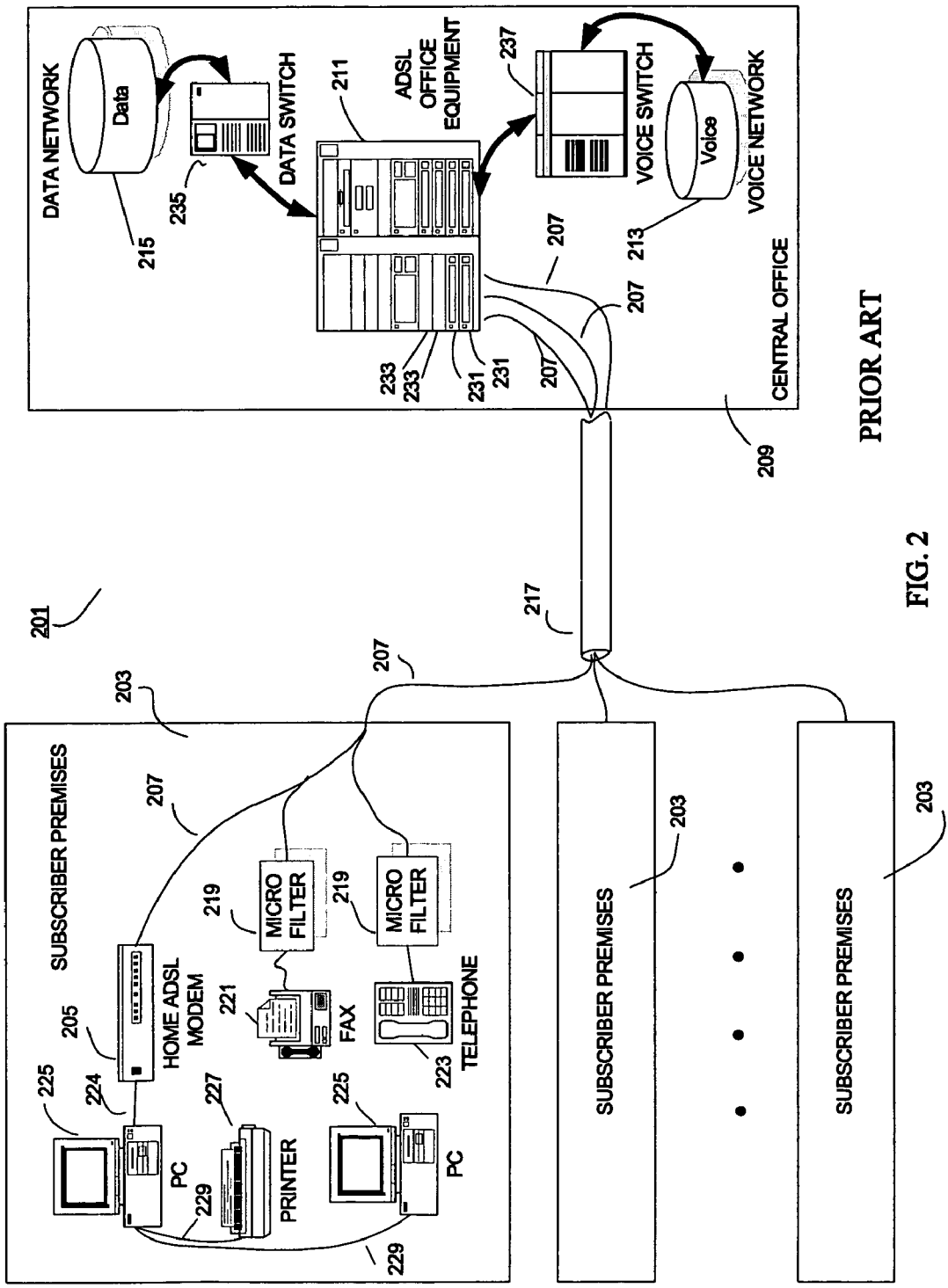
FIG. 2 is a block diagram illustrating a prior art splitterless ADSL system.

The present invention concerns systems and devices for multipoint communication in an ADSL system. The communication technique of the invention allows a subscriber to have multipoint data and voice service with a central office of a telephone service provider, as well as data communication within the SP network, using a number of NDSL modems. In accordance with the present invention, some disadvantages and shortcomings associated with the need for a continuous connection operation mode in prior art ADSL systems, have been substantially reduced.

In one embodiment of a multipoint NDSL system in accordance with the present invention, a number of NDSL modems in the SP are provided, each of which comprises an ADSL upstream transmitter and an ADSL downstream receiver for communication with an ADSL CO modem, as well as an ADSL upstream receiver and a TDM control tone receiver for data communication within the SP network. An active NDSL modem transmits a TDM control tone informing other modems in the SP that the line is busy. The control tone carries information about which of the modems is active and which is to receive data in a current communication cycle. Each modem analyzes the control tone information and, in case of a match between the received information and the I.D. number of the modem, the modem enables its ADSL upstream receiver. The control tone is at a frequency that is not used for communication with the CO and to which the ADSL CO modem is not receptive and is thus not activated thereby. After termination of data transmission, an active ADSL modem disables its upstream transmitter, stops control tone transmission and switches into a standby state.

In accordance with another embodiment of the invention, each NDSL modem within the SP further comprises a universal ADSL/VDSL upstream transmitter and VDSL upstream receiver for high speed home data network communication.

In accordance with yet another embodiment of the invention, the SP comprises one or more "VDSL-ready" NDSL modems, each of which comprises a VDSL downstream receiver for high speed communication with a VDSL CO equipment (VDSL systems are expected to replace standard ADSL CO equipment used today).

In accordance with a further embodiment of the invention, the SP comprises one or more N.LITE modems, each of which may transmit and receive line signals within the ADSL upstream frequency band to support data communication within an SP network.

In accordance with another embodiment of the invention, the SP comprises one or more N.LITE set-top boxes, each of which is coupled to the subscriber telephone line. Each N.LITE set-top box comprises an N.LITE modem and a RF transceiver, to permit radio communication with a number of different devices and mechanisms within the SP.

The invention will be further illustrated below with reference to the annexed drawings. In different drawings, like components are designated with like reference numerals and where applicable, the reader is referred to the description of previous drawings for explanations of the nature and function of components.

Figure 3:
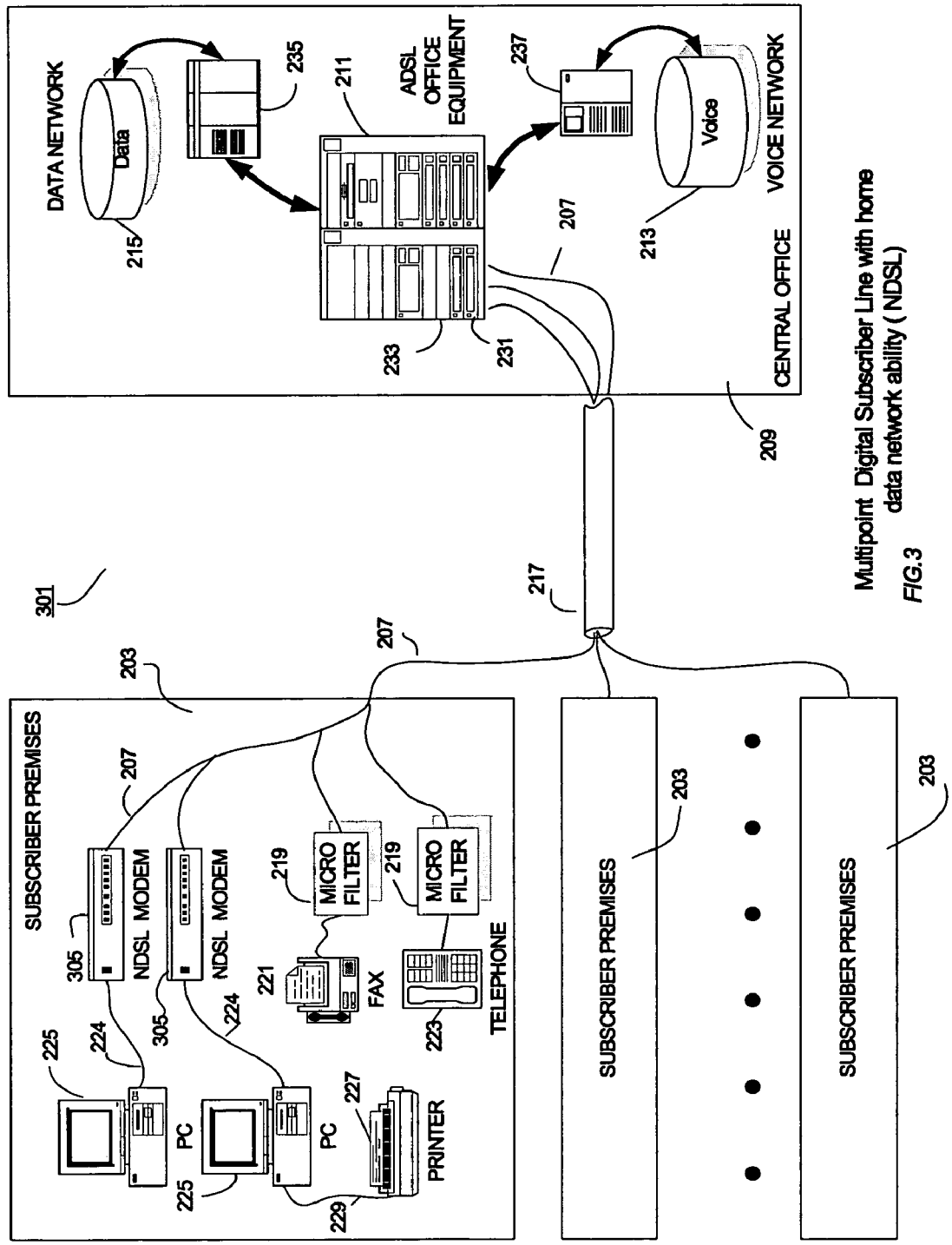
FIG. 3 is a block diagram illustrating one embodiment of the multi-point NDSL system of the invention.

Reference is first made to FIG. 3 illustrating one embodiment of a multipoint NDSL system 301. A number of subscriber premises 203 are each coupled to a CO 209 by a telephone cable 217 comprising a plurality of twisted pair subscriber telephone lines 207. At each such subscriber premises 203, which may be a residence, a small office, etc., there are premises equipment including, for example, personal computers (PCs) 225 (two in this specific example), a printer 227, a facsimile machine 221 and telephone devices 223. One of the PCs 225 is connected to printer 227 by a parallel port cable 229. NDSL modems 305 are connected directly to the telephone line 207 and each is connected through an Ethernet cable 224 to one of the PCs 225. Fax 221 and telephone devices 223 are connected to the telephone line 207 through a microfilter 219. CO 209 includes ADSL office equipment 211, a data switch 235 linked to a data network 215, and a voice switch 237 linked to voice network 213. Each twisted pair subscriber telephone line 207 is coupled to a POTS splitter 231, which is coupled to the voice switch 237 and to an ADSL office modem 233.

Each NDSL modem 305 may communicate both with the ADSL office modem 233 as well as with other home NDSL modems 305 included within the same premises. When communicating with CO 209, NDSL modem 305 transmits upstream data with a bit rate up to 1 Mb/s and receives downstream data with a bit rate up to 10 Mb/s. An NDSL modem 305 may analyze line signals and communication protocols in accordance with existing ADSL standards (T1TE1.413 or ITU G.992.1).

During data transmission with the CO, downstream data is transmitted within the ADSL downstream frequency band 105, and upstream data is transmitted inside the ADSL upstream frequency band 103. During periods of no data transmission between the CO and any of the NDSL modems, ADSL upstream frequency band 103 may be used for network communications within the SP.

The data network communication between PCs 225 may utilize the half-duplex protocol, with data packages being transmissible in two directions, with time division multiplexing (TDM). Typically only ADSL upstream frequency band 103 is used with a bit rate of up to 1.5 Mb/s. The NDSL modem 305 may make use of the same DMT line signals and different synchronization signals as in the hitherto existing ADSL standard.

Figure 4:
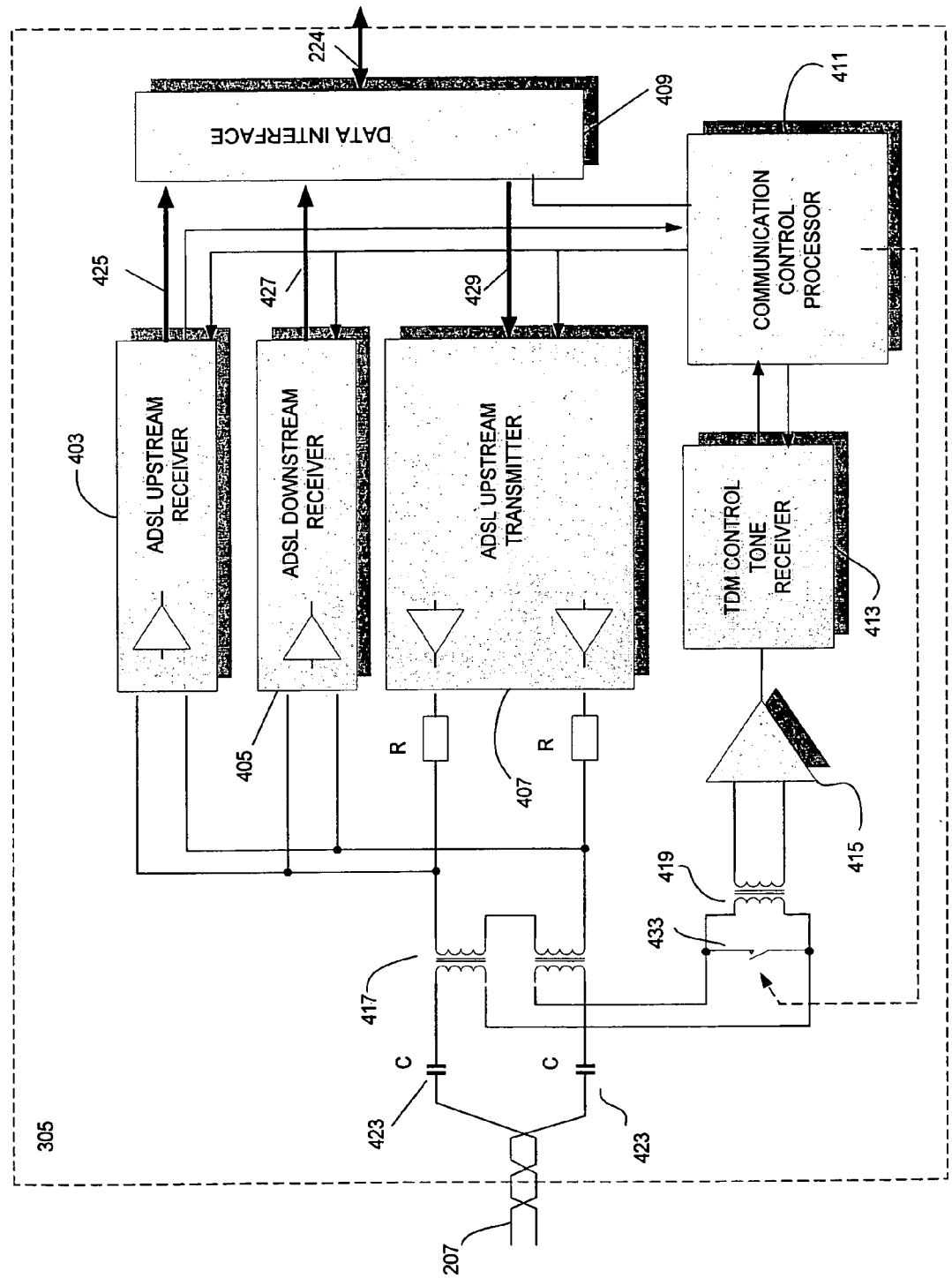
FIG. 4 is a block diagram illustrating one embodiment of an NDSL modem of the invention.

Reference is now made to FIG. 4, showing a block diagram of an NDSL modem 305 in accordance with an embodiment of the invention. Modem 305 comprises an ADSL upstream receiver 403, an ADSL downstream receiver 405, an ADSL upstream transmitter 407, a data interface circuit 409, a communication processor 411, a control tone receiver 413, a high impedance amplifier 415, a line transformer 417 and a control tone transformer 419. A primary winding of the line transformer 417 is coupled to the subscriber telephone line 207 via a high pass filter capacitor 423 into a primary winding of control tone transformer 419. A secondary winding of the line transformer 417 is coupled to the input of ADSL upstream receiver 403, to an input of the ADSL downstream receiver 405 and to an output of the ADSL upstream transmitter 407. A secondary winding of the control tone transformer 419 is coupled to the input of the high impedance amplifier 415, the output of which is connected to the input of the TDM control tone receiver 413. An input of the ADSL upstream transmitter 407, an output of the ADSL upstream receiver 403 and an output of the ADSL downstream receiver 405, are connected to the data interface circuit 409, by means of digital buses 429, 425, and 427 respectively. Data interface circuit 409 is coupled to the SP equipment by an Ethernet cable 224. A communication processor 411 is coupled to the ADSL upstream receiver 403, to ADSL downstream receiver 405, to ADSL upstream transmitter 407, to control tone receiver 413 and to switch 433 that is connected in parallel to the primary winding of control tone transformer 419.

Figure 5:
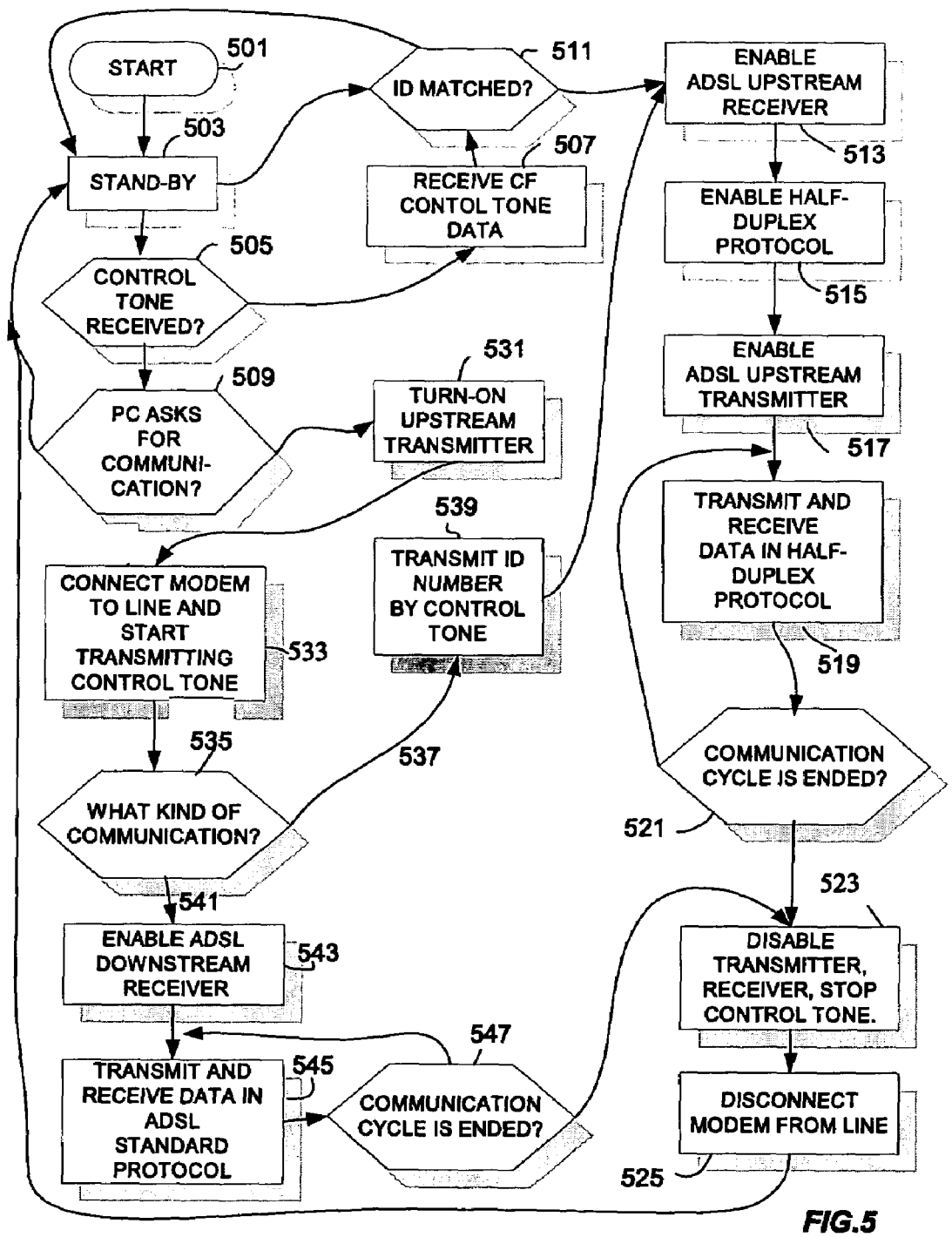
FIG. 5 is a flow chart of the operation of the NDSL modem.

Reference is now made to FIG. 5 showing a flow chart of operation of the NDSL modem 305. At the start of operation 501, the NDSL modem goes into a standby state 503. In this stage, switch 433 is open and the end NDSL modem 305 has a high input impedance inflicted by the high impedance amplifier 415 and low frequency control tone transformer 419. This allows to link a plurality of NDSL modems to be linked to the same subscriber telephone line 207. In this stage ADSL upstream transmitter 407, ADSL upstream receiver 403 and ADSL downstream receiver 405 are disabled. Against this, control tone receiver 413 is enabled, permitting communication processor 411 to analyze the output signal of control tone receiver 413 as well as signals from digital interface circuit 409. From the standby state 403, the NDSL modem enters into state 505 and in this state the output signal of control tone receiver 413 is analyzed. If a control tone is received, NDSL modem enters state 507; if not, it enters state 509. In state 507, a communication processor 411 analyzes information carried by the control tone and enters state 511 to analyze the received data. If communication processor 411 establishes a match between the received data and its own I.D., NDSL modem enters state 513 in which it may communicate with another home NDSL modem; if not, the modem switches back to a standby state 503. In state 513, which is the first communication state, the ADSL upstream receiver 403 is enabled, permitting communication in a half-duplex protocol 515 and subsequently turning on ADSL upstream transmitter 517. At the next state 519, a transmission-receiving mode between two NDSL modems is enabled, permitting receipt and transmission of data packets. After transmitting or receiving all data packets, the NDSL modem communicates to establish whether a communication cycle has ended or not (state 521); if not, the NDSL modem continues to transmit or receive additional data packets. If the communication cycle ends, the NDSL modem disables the upstream receiver and the upstream transmitted and stops transmission of control tone (state 523) to inform other devices that the telephone line is now not busy. At a subsequent state 525, the NDSL modem is disconnected from the line and enters into a standby state 503.

If in state 505 the control tone is not received, the NDSL modem enters state 509. If a PC is asking for communication, the NDSL modem enters state 531; if not—the modem goes back to standby state 503. In state 531, the NDSL modem is connected to the telephone line, with upstream transmission being enabled, and then enters state 533 in which control tone transmission is initiated to inform any other device that the line is busy. In a subsequent state 535, the nature of communication needed by the PC is defined. In the case of communication with another NDSL modem 537, information about the I.D. number of the modem is transmitted (state 539), and then NDSL modem enters state 513 to enable ADSL upstream receiver. In the case of communication with CO 209, the standard ADSL duplex protocol may be used and the modem may operate in an FDM mode. Otherwise, the modem enters state 547 in which it asks the PC whether the communication cycle has ended. If the communication cycle has ended, the modem switches to state 523. If not, it switches to ADSL transmission/receiving state 545.

Figure 6:
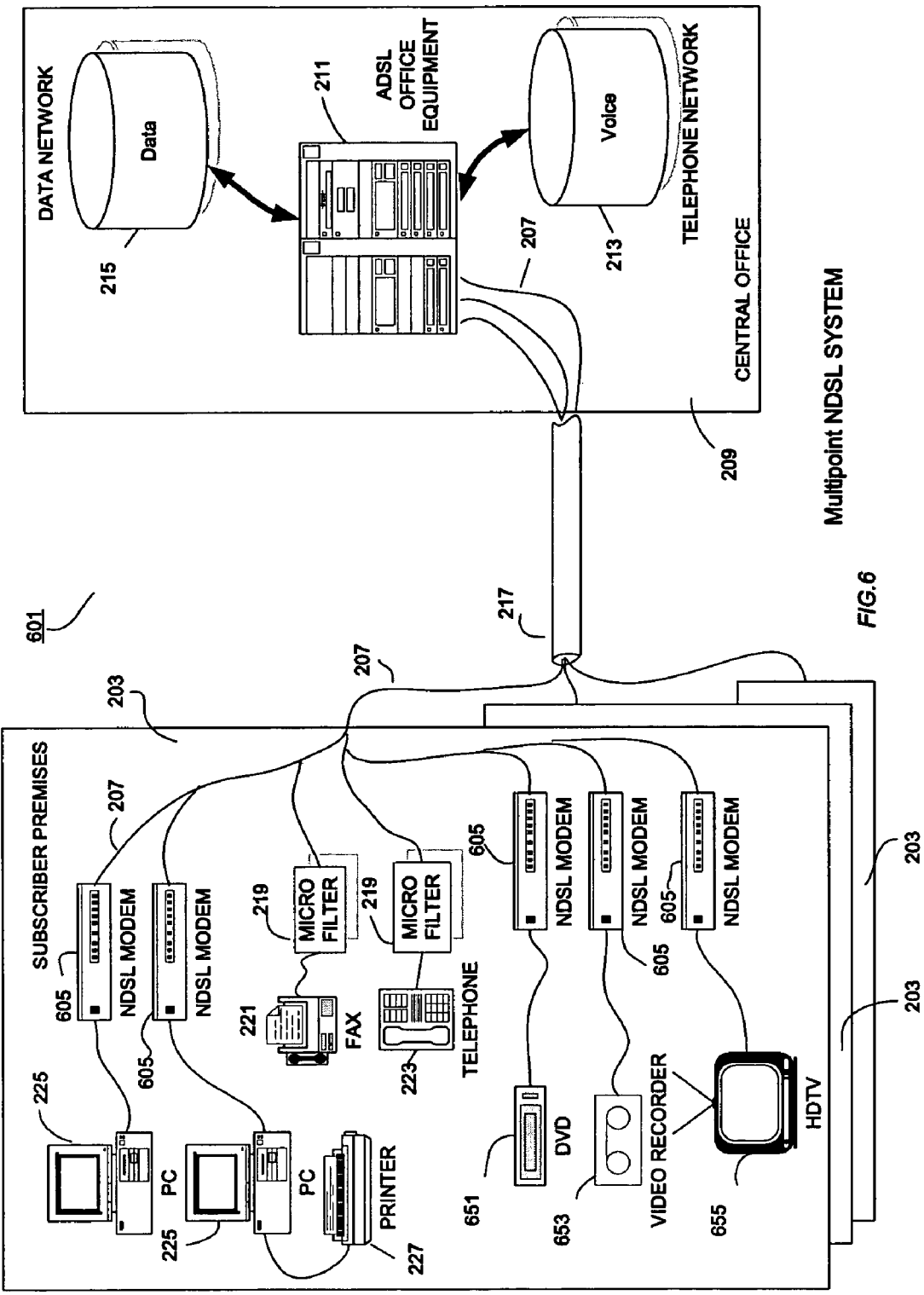
FIG. 6 is a block diagram illustrating another embodiment of a multipoint NDSL system according to the invention.

Reference is now made to FIG. 6 illustrating another embodiment of a multipoint NDSL system 601. A number of subscriber premises 203 are connected to the CO 209 through a telephone cable 217 comprising a plurality of twisted pairs of subscriber telephone lines 207, similar to the embodiment shown in FIG. 3. A subscriber premises 203 comprises communication equipment similar to those shown in FIG. 3 and further video equipment consisting of a video recorder 653, an HDTV television 665 and a DVD player 651. Each of these video devices is coupled to a high speed NDSL modem 605 by a digital cable 324. Each of modems 605 is directly connected to telephone line 207. CO 209 is similar to that shown in FIG. 3.

Each of high speed NDSL modems 605 can communicate with the ADSL office modem 233 as well as with other high speed NDSL modems 605 and with NDSL modems 305. For communication with CO 209, modems 305 and 605 may transmit upstream data with a bit rate up to 1 Mb/s and receive downstream data with a bit rate up to 10 Mb/s.

The high speed NDSL modem 605 comprises a universal ADSL/VDSL upstream transmitter and an ADSL downstream receiver for communication with the ADSL office modem, and an ADSL upstream receiver, a VDSL upstream receiver and a control tone receiver for home data network communication. The universal ADSL/VDSL transmitter can transmit DMT signals only in the ADSL upstream frequency band 103 for communication with the ADSL office modem, as well as in the VDSL upstream frequency bands 111 and 113 for communication with other high speed NDSL modems within the subscriber premises.

Figure 7:
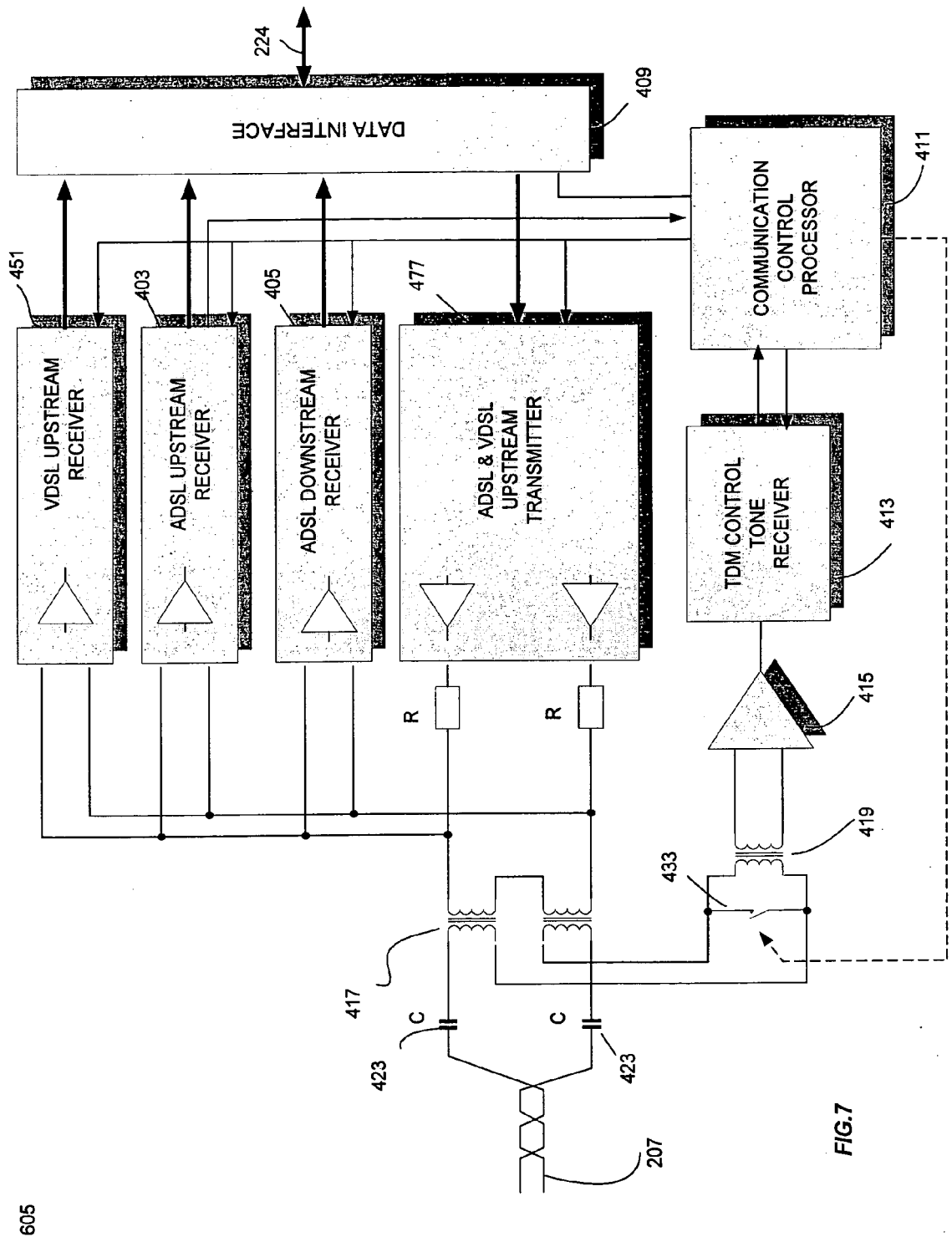
FIG. 7 is a block diagram illustrating another embodiment of an NDSL modem of the invention.

A block diagram of high speed NDSL modem 605 in accordance with an embodiment of the present invention is shown in FIG. 7. Like components to those of the NDSL modem 305 shown in FIG. 4 have been given like reference numerals and the reader is referred to the description of FIG. 4 for an explanation of their nature and function. The main difference between modem 605 and 305 lies in the inclusion of VDSL upstream receiver 451 and in the inclusion of an ADSL/VDSL upstream transmitter 477 instead of transmitter 407 in modem 305. The principles of operation of this modem are similar to those of modem 305, mutatis mutandis.

Figure 8:
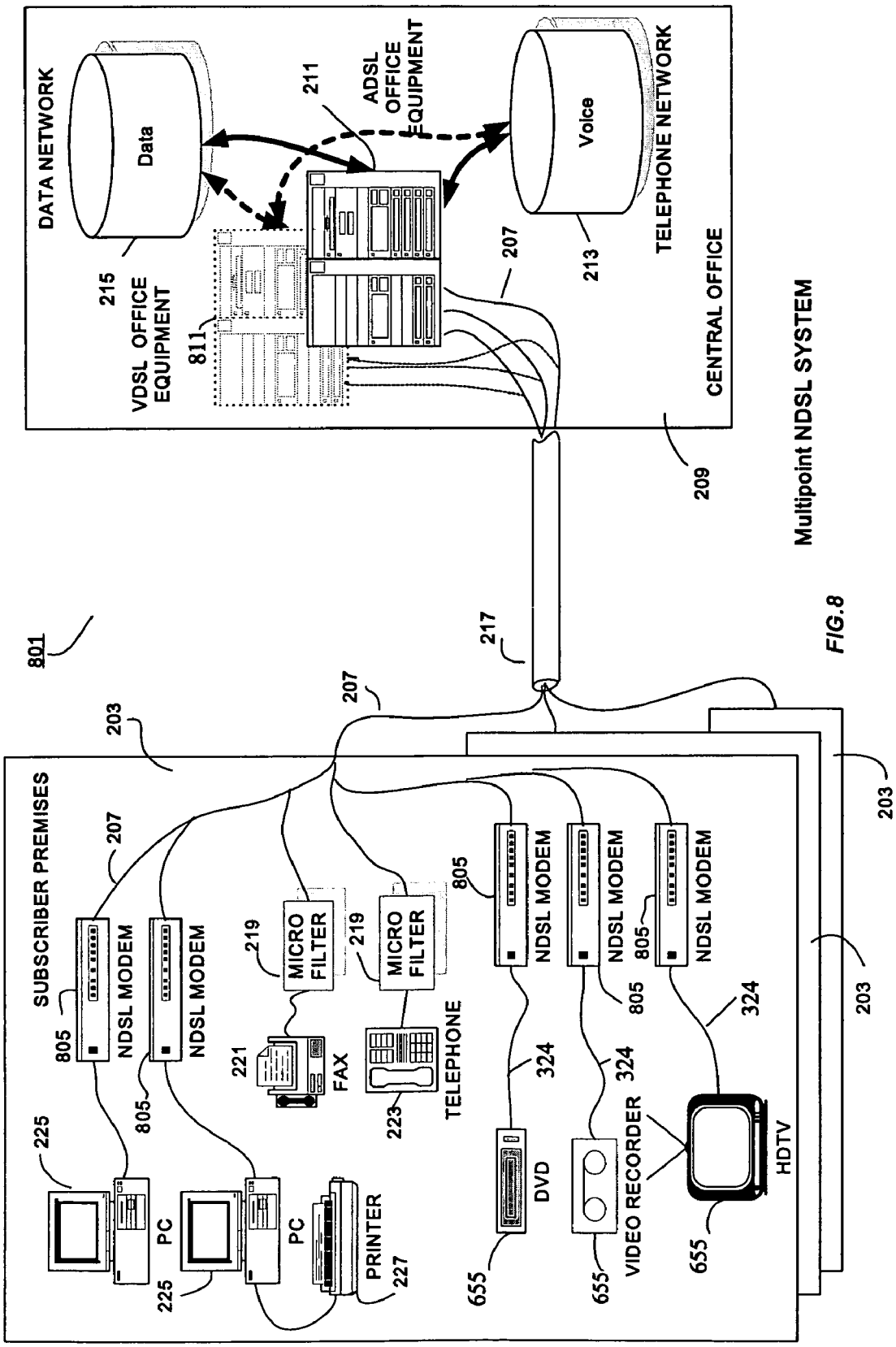
FIG. 8 is a block diagram illustrating another embodiment of a multipoint NDSL system of the invention.

Reference is now made to FIG. 8 showing a system 801 in accordance with another embodiment of the invention. Here again, like components to those of previous figures have been given like reference numerals and the reader is referred to the description above for an explanation of their nature and function. In this embodiment, the subscriber premises 203 comprises VDSL-ready NDSL modems 805. Modem 805 permits communication with the standard ADSL office equipment 211 as well as with VDSL office equipment 811, which may replace the ADSL office equipment 211 in the future. Furthermore, similar to the case of modems 305 and 605, modem 805 also permits communication with other NDSL modems 805, as well as with modems 605 or 305 within the subscriber premises. Modem 805 may use line signals and communication protocols in accordance with existing ADSL standards (T1E1.413 or ITU G.992.1). Communication with CO ADSL equipment 211 may be similar to the case of modems 305 or 605. In case of communication with VDSL office equipment 811, modem 805 may transmit upstream data with a bit rate of up to 28 Mb/s and may receive downstream data with a bit rate of up to 50 Mb/s. When communicating in the VDSL mode, modem 805 may use line signals in communication protocols of existing VDSL standards.

For data communication within the SP, modem 805 may utilize the half-duplex protocol in both ADSL upstream frequency band 103, as well as in VDSL upstream frequency bands 111 and 113. Inter-premises data exchange may have a bit rate of up to 12 Mb/s (when communicating only in the first VDSL upstream band) or of up to 28 Mb/s (when utilizing both bands 111 and 113). The DMT line signals utilized by modem 805 may be transmitted both in the ADSL and VDSL upstream bands.

A VDSL-ready NDSL modem 805 comprises a universal ADSL/VDSL upstream transmitter and an ADSL downstream receiver for communication with an ADSL office modem, a VDSL downstream receiver for communication with a VDSL office modem, and a an ADSL upstream receiver, a VDSL upstream receiver and a control tone receiver for home data network communication. A universal ADSL/VDSL upstream transmitter is able to transmit DMT signals in the ADSL upstream frequency band 103 for communication with the ADSL office modem, in the VDSL upstream bands 111 and 113 for communication with a VDSL office modem, and in both the ADSL and VDSL upstream frequency bands 103, 111 and 113 for communication with other VDSL-ready NDSL modems.

Figure 9:
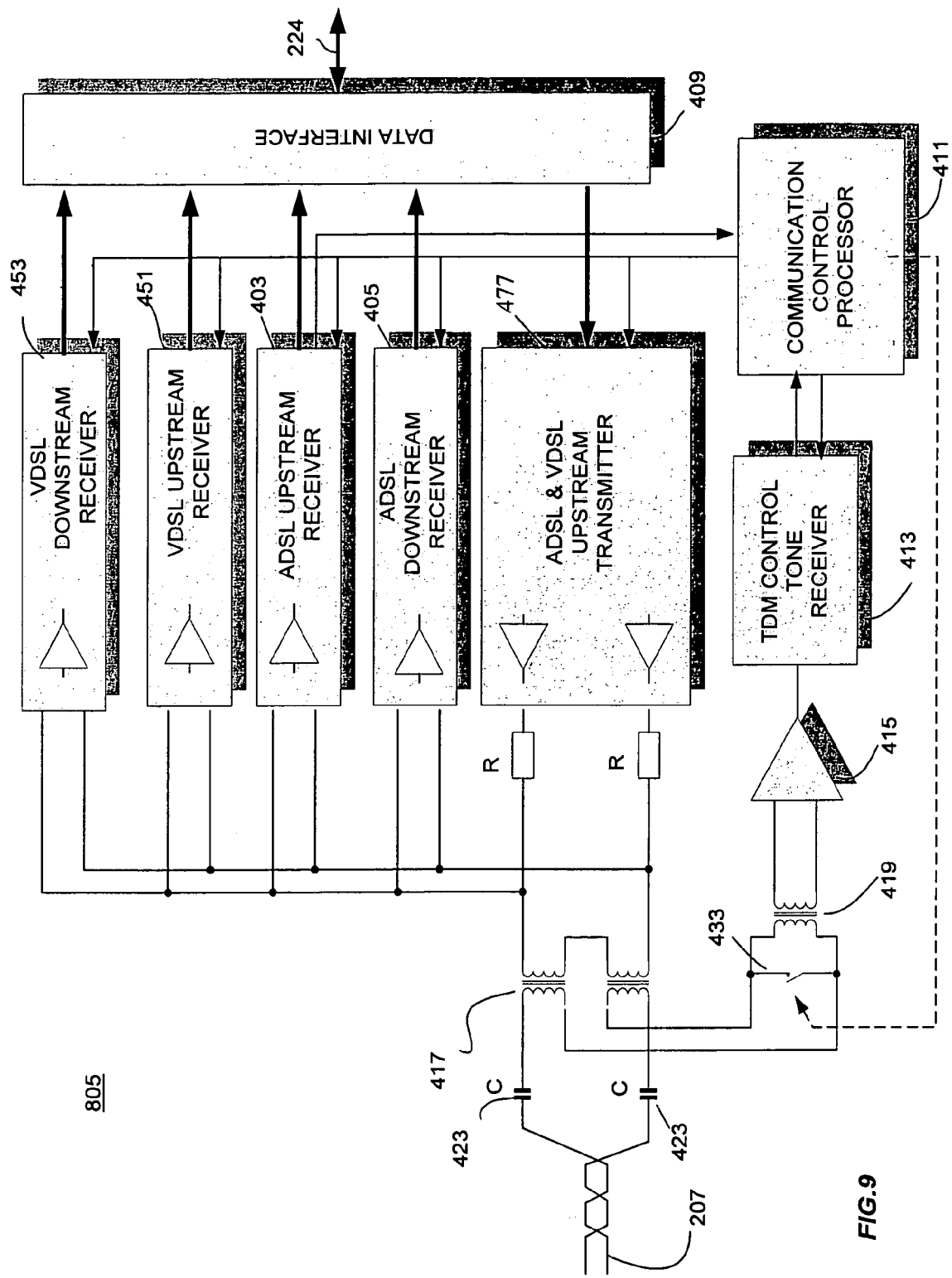
FIG. 9 is a block diagram illustrating another embodiment of an NDSL modem of the invention.

A block diagram of a VDSL-ready NDSL modem 805 is shown in FIG. 9. Like components to those of modems 305 and 605 shown in FIGS. 4 and 6 have like reference numerals. This modem is similar to modem 605 with the main difference being the addition of the VDSL downstream receiver 453. Otherwise, its structure and mode of operation are similar to those of modem 605 and in this connection the reader is referred to the description above.

Figure 10:
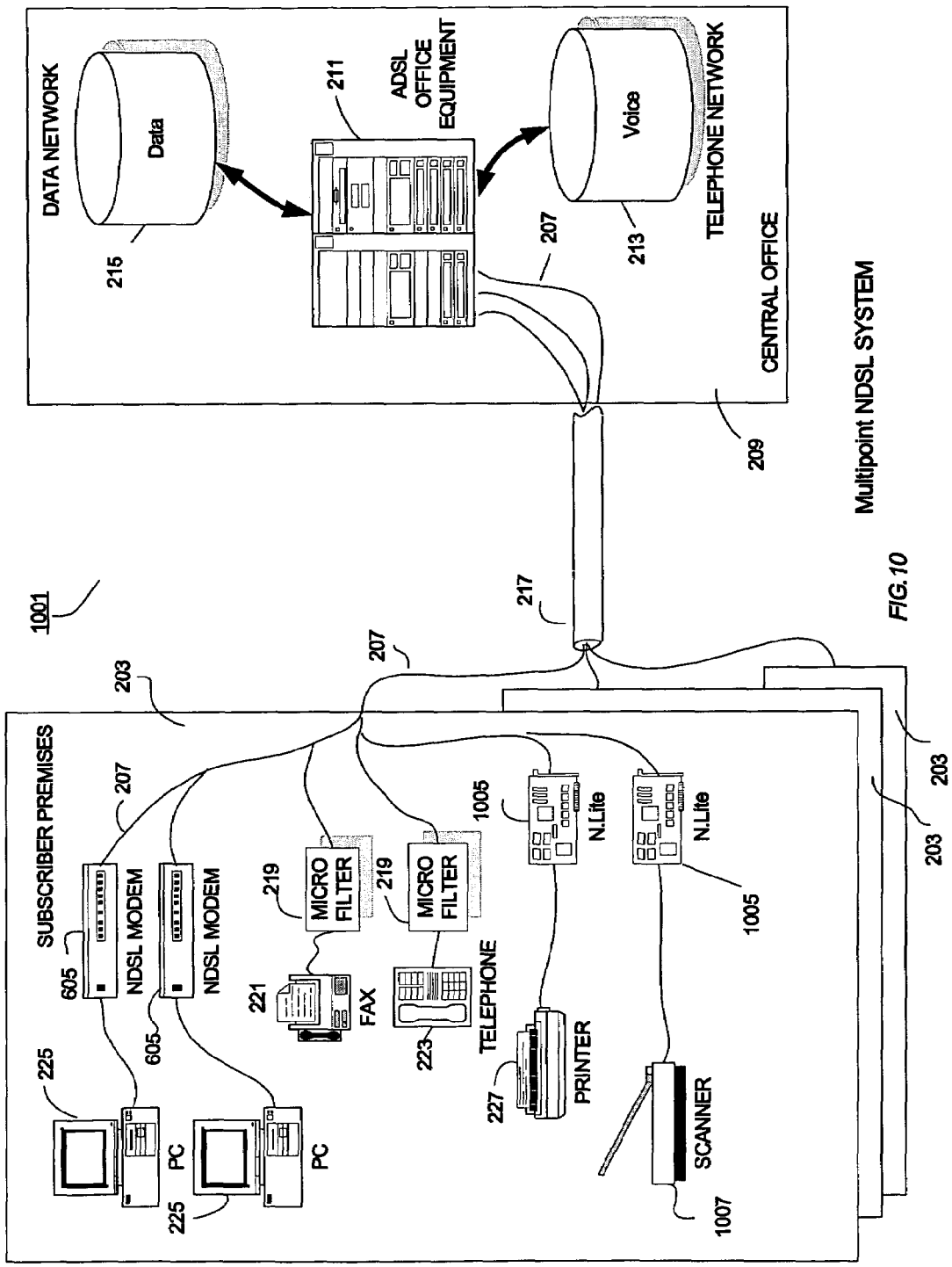
FIG. 10 is a block diagram illustrating another embodiment of a multipoint NDSL system of the invention.

A multipoint NDSL system 1001 in accordance with another embodiment of the invention can be seen in FIG. 10. A subscriber premises, in accordance with this embodiment, comprises N.LITE modems 1005, each of which is connected directly to a telephone line 207. Each N.LITE modem 1005 may communicate with other N.LITE modems 1005 or with other NDSL modems, e.g. modem 605, located in the subscriber's premises. Thus, an N.LITE 1005 may support only home data network communication.

For home data network communication, the N.LITE modem 1005 uses a half-duplex protocol and the information transmits in two directions of data packets, with time division multiplexing (TDM). The N.LITE modem 1005 communicates, in this embodiment, only within the ADSL upstream frequency band 103. The data exchange between N.LITE modems 1005 may thus have a bit rate of up to 1.5 Mb/s. Each of the N.LITE modems 1005 may be linked to a home digital equipment such as a printer 227 or a scanner 1007.

Figure 11:
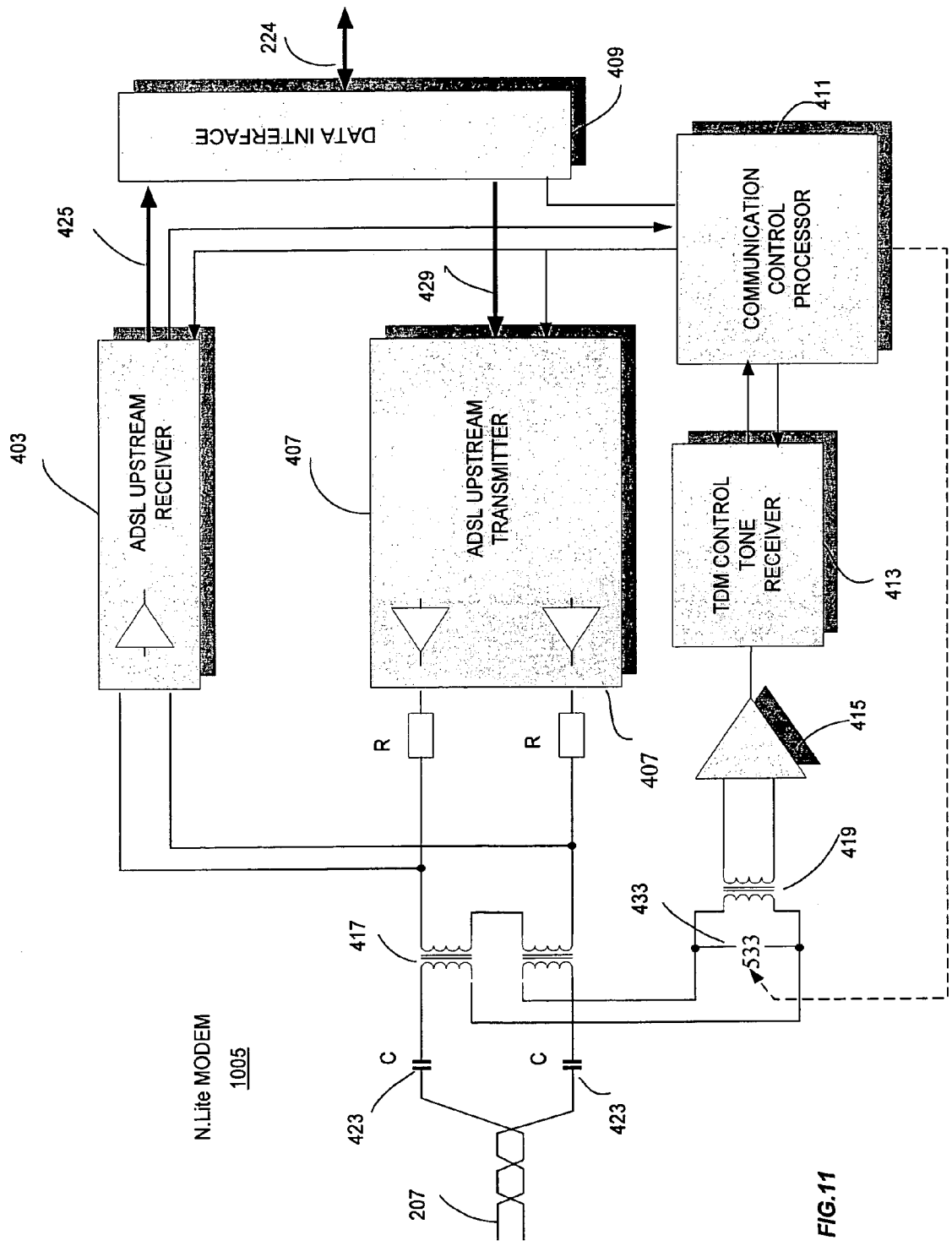
FIG. 11 is a block diagram illustrating one embodiment of an NDSL modem of the invention.

A block diagram of an N.LITE modem 1005 can be seen in FIG. 11. N.LITE modem 1005 differs from modem 305 (FIG. 4) in that the former does not include the ADSL downstream receiver 405. Otherwise its mode of operation is similar to that of modem 305, mutatis mutandis.

Figure 12:
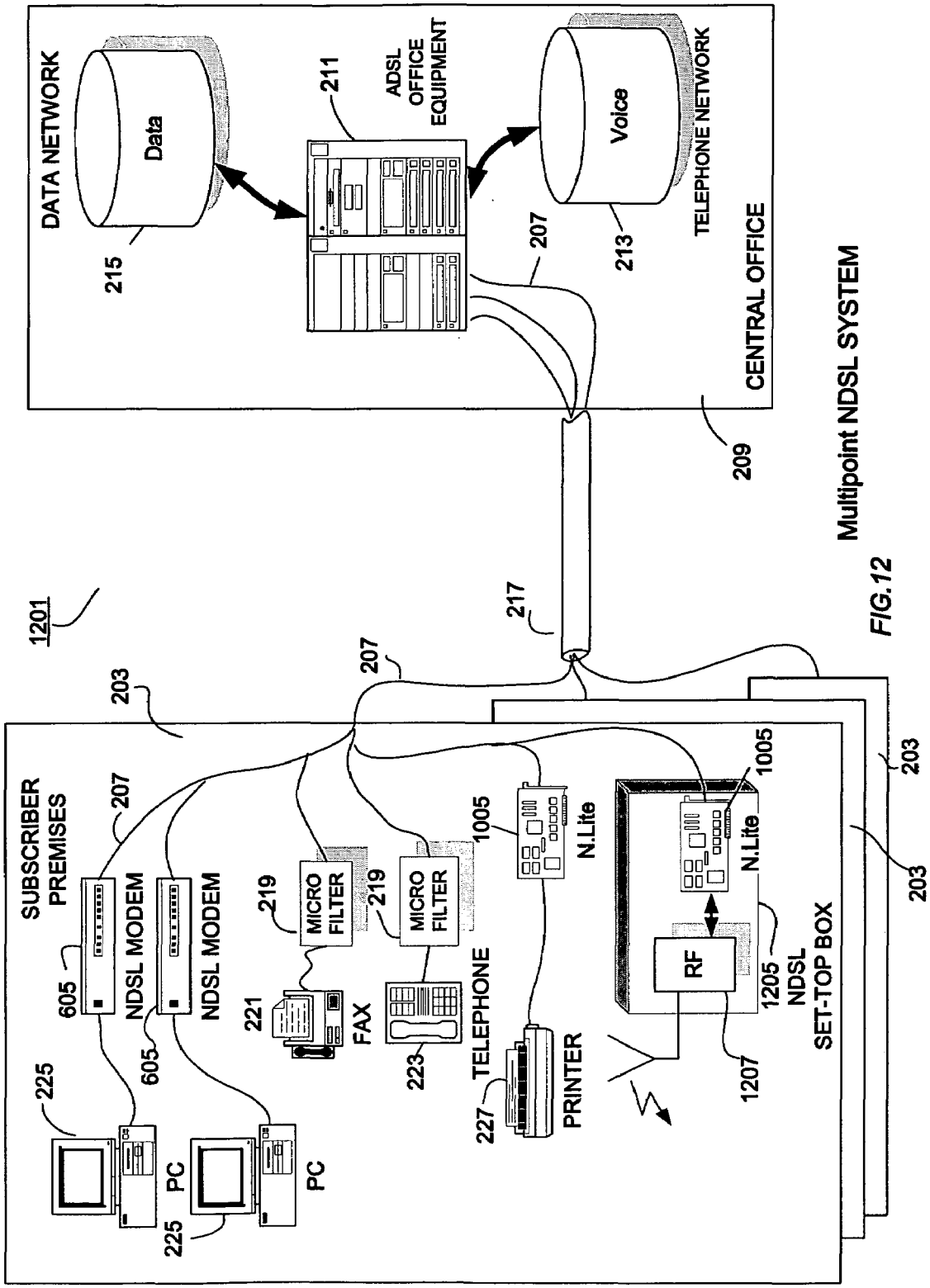
FIG. 12 is a block diagram illustrating another embodiment of a multipoint NDSL system of the invention.

A multipoint NDSL system 1201 in accordance with another embodiment of the invention can be seen in FIG. 12. In this embodiment, one of N.LITE modems 1005 is included within an NDSL set top box 1205 which also comprises an RF transceiver 1207 for controlling, through transmission of radio signals, a number of mechanical and electrical devices in the home.

What is claimed is:

1. A network DSL (NDSL) modem for communicating on an xDSL telephone line, the NDSL modem comprising:
    a network modem to communicate along an upstream frequency band of said xDSL line with at least one other NDSL modem connected in a subscriber premises to said xDSL telephone line; and
    a control tone transmitter to transmit a control signal to which a central office modem in a central office (CO) of a communication system is not receptive for signaling said at least one other NDSL modem to be ready to receive data packets.

2. The modem according to claim 1 wherein said control signal is at a frequency not used for communication between said NDSL modem and said central office modem.

3. The modem according to claim 1 and wherein said network modem comprises an upstream frequency band transmitter and an upstream frequency band receiver.

4. The modem according to claim 3 wherein said transmitter and receiver perform time division multiplexing (TDM).

5. The modem according to claim 1 and also comprising an RF transceiver for control of a home device.

6. The modem according to claim 1 and also comprising a DSL modem to communicate with said CO along said xDSL telephone line.

7. The modem according to claim 6 and wherein said DSL modem comprises an upstream frequency band transmitter and a downstream frequency band receiver.

8. The modem according to claim 6 wherein said network modem exchanges data with said at least one other NDSL modem during time periods in which none of said NDSL modems is communicating with said CO.

9. A network DSL (NDSL) modem for communicating on an xDSL telephone line, the NDSL modem comprising:
    a DSL modem to communicate with a central office (CO) of a communication system along said xDSL telephone line; and
    a network modem to communicate along an upstream frequency band of said xDSL line with at least one other NDSL modem connected in a subscriber premises to said xDSL telephone line.

10. The modem according to claim 9 and wherein said network modem comprises an upstream frequency band transmitter and an upstream frequency band receiver and said DSL modem comprises an upstream frequency band transmitter and a downstream frequency band receiver.

11. The modem according to claim 9 wherein said network modem performs time division multiplexing (TDM) and said DSL modem operates according to the xDSL protocol.

12. The modem according to claim 9 wherein said network modem exchanges data with said at least one other NDSL modem during time periods in which none of said NDSL modems is communicating with said CO.

13. The modem according to claim 9 wherein said network modem comprises a control tone transmitter to transmit a control signal to which a central office modem in a central office (CO) of a communication system is not receptive for signaling said at least one other NDSL modem to be ready to receive data packets.

14. The modem according to claim 13 wherein said control signal is at a frequency not used for communication between said NDSL modem and said central office modem.

15. A method for communication on an xDSL telephone line, the method comprising:
    when communication to a central office modem in a CO of a communication system is desired, transmitting data to the CO modem in an xDSL upstream frequency band and receiving data therefrom in an xDSL downstream frequency band;
    when communication between at least two NDSL modems connected to said telephone line in a subscriber premises is desired:
        transmitting a control signal to which said central office modem is not receptive; and
        while said control signal is transmitting, communicating data among said at least two NDSL modems along an upstream frequency band of said xDSL line.

16. The method according to claim 15 wherein said control signal is at a frequency not used for communication between said NDSL modem and said central office modem.

17. The method according to claim 15 wherein said communicating comprises performing time division multiplexing (TDM) and wherein said transmitting and receiving comprises operating according to the xDSL protocol.

18. The method according to claim 15 wherein said two transmitting steps do not occur at generally the same time.

19. A method for communication on an xDSL telephone line, the method comprising:
    when communication between at least two NDSL modems connected to said telephone line in a subscriber premises is desired:
        determining that none of the NDSL modems are communicating with a central office modem in a CO of a communication system;
        if no NDSL modems are communicating, transmitting a control signal to which a central office modem is not receptive; and
        while said control signal is transmitting, communicating data among said at least two NDSL modems along an upstream frequency band of said xDSL line.

20. The method according to claim 19 wherein said control signal is at a frequency not used for communication between said NDSL modem and said central office modem.

21. The method according to claim 19 wherein said communicating comprises performing time division multiplexing (TDM).

* * * * *